(12) United States Patent
Kaupp

(10) Patent No.: US 6,691,967 B2
(45) Date of Patent: Feb. 17, 2004

(54) HOLDER FOR A BEVERAGE CONTAINER

(75) Inventor: Klaus Kaupp, Waldachtal (DE)

(73) Assignee: Fischer Automotive Systems GmbH, Horb (DE)

( * ) Notice: Subject to any disclaimer, the term of this patent is extended or adjusted under 35 U.S.C. 154(b) by 0 days.

(21) Appl. No.: 10/271,001

(22) Filed: Oct. 15, 2002

(65) Prior Publication Data

US 2003/0075661 A1 Apr. 24, 2003

(30) Foreign Application Priority Data

Oct. 19, 2001 (DE) .......................................... 101 51 794

(51) Int. Cl.⁷ ................................................. A47K 1/08
(52) U.S. Cl. ..................................... 248/311.2; 224/926
(58) Field of Search ............................... 248/311.2, 313; 224/926, 539, 148.7; 297/188.01, 188.14–188.19

(56) References Cited

U.S. PATENT DOCUMENTS

| | | | | |
|---|---|---|---|---|
| 5,257,765 A | * | 11/1993 | Halle | 248/222.13 |
| 5,671,877 A | * | 9/1997 | Yabuya | 224/282 |
| 5,749,554 A | * | 5/1998 | Avila et al. | 248/311.2 |
| 5,791,618 A | * | 8/1998 | Lancaster | 248/311.2 |
| 5,839,711 A | * | 11/1998 | Bieck et al. | 248/313 |
| 5,921,519 A | | 7/1999 | Dexter et al. | 248/311.2 |
| 6,092,775 A | | 7/2000 | Gallant | 248/311.2 |

* cited by examiner

Primary Examiner—Korie Chan
(74) Attorney, Agent, or Firm—Michael J. Striker

(57) ABSTRACT

A holder (10) for a beverage container, such as a beverage bottle, is integratable into a motor vehicle. The holder includes a support (16) that is pivotable on a side wall (20) of a pigeon hole (12) so that by swiveling of the support (16), a receiving area for placement of the drink container (48) is separable from the remainder of the pigeon hole (12). By swiveling of the support (16), the size of the receiving area is adjustable.

6 Claims, 3 Drawing Sheets

HOLDER FOR A BEVERAGE CONTAINER

BACKGROUND OF THE INVENTION

The present invention relates to a holder for a beverage container, such as, for example, a drink bottle, a cup, or a glass.

Such types of holders are known, in particular, those which are built into motor vehicles. Typically, the holders have a receiving area for placement of the drink container. For adapting the holder to drink containers with various diameters, it is also known, for example, to provide a pivotable diameter-equalizing shutter or cover on an edge of the receiving area, which is pressed into the receiving area in a spring-action manner. Upon placement of a drink container in the receiving area, the beverage container presses the spring-action diameter-equalizing shutter to the side to a point that is as wide as the diameter of the drink container. The spring-action diameter-equalizing shutter presses the placed beverage container to an opposite side of the receiving area and holds the beverage container stable therein.

The invention addresses the problem of providing a holder of the above-described type, in which the size of the receiving area is adjustable and which can be adaptable to the diameter of a drink container.

SUMMARY OF THE INVENTION

This problem is resolved with the present invention. The inventive holder has a swiveling support, whose distance from a side wall of the receiving area is adjustable by swiveling of the support. In this manner, an area of the receiving area opposite the support is common with the side wall of the receiving area. A beverage container placed in the receiving area is located between the side wall and the support and is held stable by the side wall and support. A shape of the support is desired that fulfills the purpose of holding a drink container in cooperation with the side wall. By means of a securing device, the support of the inventive holder retained in its respective swivel position and, therewith, in its distance from the side wall of the receiving area.

The securing device of the inventive holder has a securing element, which is arranged spaced from the swivel axis of the support and which is fixedly connected with the support. The securing element, for example, can be disposed on a lever arm, which projects from a swivel shaft of the support. The securing element is pressed from a spring element against a counter element fixed with the holder. A connection between the securing element and the counter element can be friction and/or form-locking, such that the securing element can, for example, be a friction lining, which is pressed by the spring element against a fixed counter surface. The securing element, which is fixed to the support and pressed by the spring element against the fixed counter element, holds the support against swiveling and maintains the support in its position. For displacement of the support, the securing element is lifted up against the force of the spring element from the fixed counter element and the swivels the support.

The invention makes possible a constructively simple holder made of relatively few individual components with a possibility for adjustment of the size of the receiving area for the drink container.

One form of the invention contemplates that the securing element and/or the counter element is circular and concentric to the swiveling axis of the support.

In order to reliably hold the support in its adjusted swiveling position, one form of the invention contemplates a locking device as a securing device, that is, a securing device, in which the support is held in its respective swiveling position by a form-locking of the securing element with the fixed counter element. The locking device, for example, can have a detent or latch or a pin, which engaged in a one of a plurality of complementary receiving areas, whereby each of the receiving areas provides a swiveling position of the support. One form of the present invention contemplates teeth for the securing element and the counter element, whereby for one of the two elements, a separate tooth is sufficient.

In a preferred form of the invention, the securing element and the counter element are disposed on an underside of a bottom or floor of the receiving area for placement of the drink container. This makes possible a constructively simple form of the securing device. With a built-in holder, the securing device is not visible.

In another preferred form of the invention, the holder is integrated in an upwardly opening pigeon hole. In this manner, a part of a side wall of the pigeon hole, for example, in the area of a corner of the pigeon hole, forms the side wall of the receiving area of the holder for the drink container. The support is so arranged, that it is able to be brought into the swivel position, in which it separates an area of the pigeon hold as the receiving area for placement of the drink container from the rest of the pigeon hole. When the support is not in use, preferably it is swiveled or pivoted out from the pigeon hold, for example, into a receiving area of the side wall of the pigeon hole. The support of the inventive holder, in use, forms a division or component of the pigeon hole. This form of the invention has the advantage of a double use of a pigeon hole also as a holder for a drink container. When the holder is not in use, the entirety of the pigeon hole is useable.

DETAILED DESCRIPTION OF THE PREFERRED EMBODIMENTS

Figure 1:
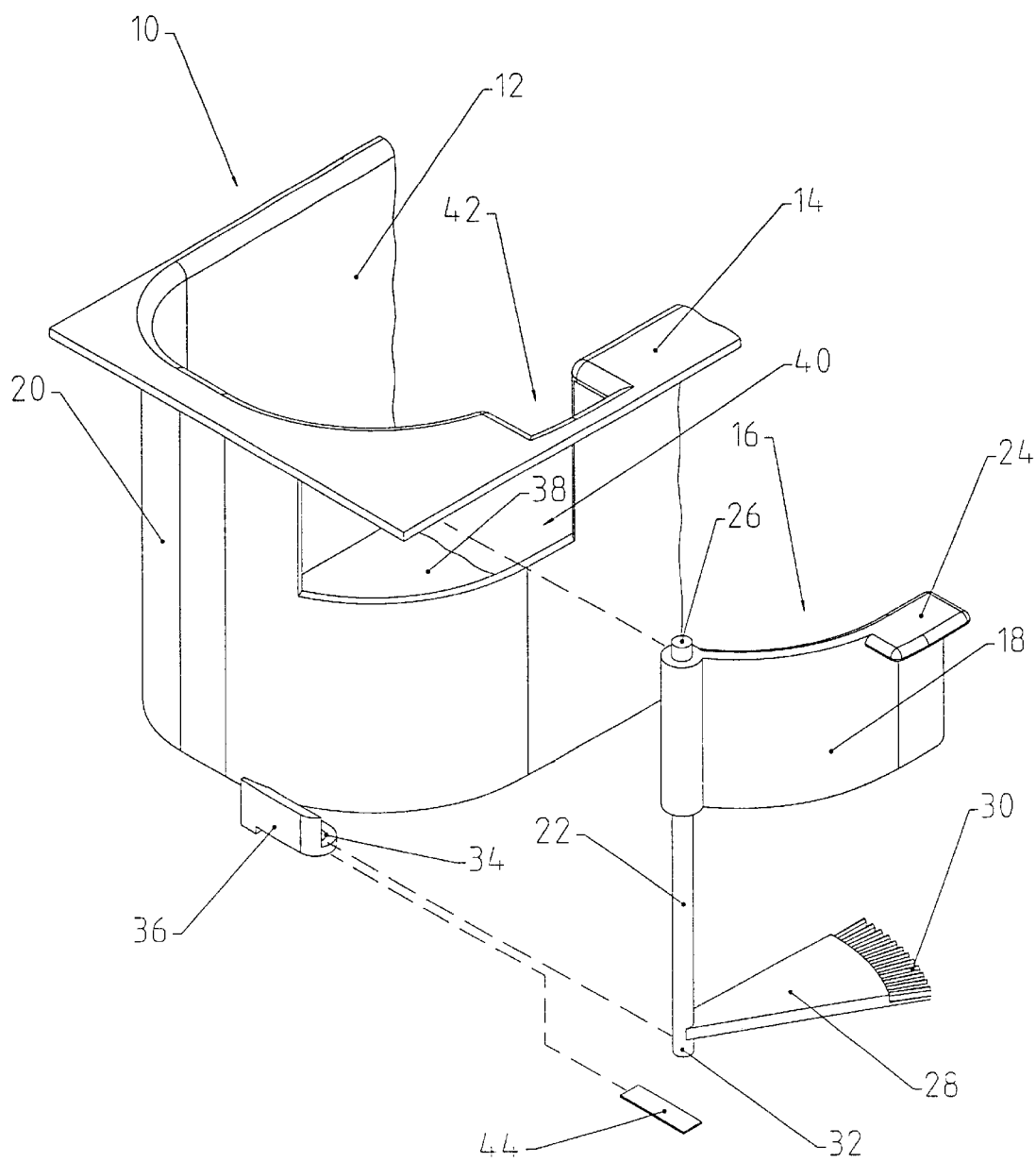
FIG. 1 shows the individual parts of the inventive holder in a prospective representation, projecting upwardly.

The inventive holder for a drink container, designated in its entirety as reference numeral 10, is integrated in a cubby hole or pigeon hole 12. The pigeon hole 12, in plan view, has the shape of an oval pot or top and has a rectangular mounting edge 14 for lowered mounting of the pigeon hole 12, for example, in a motor vehicle (not shown). Only an end of the pigeon holder 12 is shown in the drawing.

In addition, the holder 10 also has a support 16. The support 16 includes a curved, arched plate 18, whose arch corresponds to a curve of a side wall 20 of the pigeon hole 12. The plate 18 is one-piece with a swivel shaft 22, which is disposed vertically in the use position. The plate 18 stands up in one direction from the swivel shaft 22. On an end remote from the swivel shaft 22, the plate 18 has a push button 24 that is one-piece and fixed with the plate 18. The swivel shaft 22 projects a short distance upwardly over the plate 18 in the form of a swiveling positional pin 26. The swivel shaft 22 has a length in its entirely that approximately corresponds to a height of the pigeon hole 12. Near a lower end, a plate-shaped arm 28 projects from the swivel shaft 22, the arm 28 being fixed and one-piece with the shaft 22. The arms 28, in plan view, have the shape of an acute-angled, circular sector. On an outer edge, the arm 28 is provided with toothing 30, the teeth of which are arranged on a side of the plate-shaped arm 28 like the teeth of an axle-drive bevel wheel. The toothing 30 is circular and concentric to the swivel shaft 22. Also on the lower end, the swivel shaft 22 projects a short distance over the arm 28 in the form of a swiveling positioning pin 32.

Upon assembly of the holder 10, the swiveling positional pins 26, 32 of the support 16 are inserted in positioning holders of the pigeon hole 12. An upper of the two positioning holes is found on an underside of the mounting edge 14 and is not visible in the drawings. A lower positioning hole 34 is formed in a support cover plate 36, which is provided in an area of a floor 38 and on an outer side of the pigeon hole 12. The support cover plate 36 is one-piece with the pigeon hole 12. The swivel shaft 22 is found in the assembled holder 10 on an outer side of the side wall 20, as shown in FIG. 3. The plate 18 of the support 16 is located in a recess 40 of the side wall 20, the button 24 in a recess 42 in the mounting edge 14. The plate 18 may be moved out of a swiveling position, which is essentially flush with the side wall 20, as shown in FIG. 2 and is swiveled inwardly into the pigeon hole 12, as shown in FIG. 3.

Figure 2:
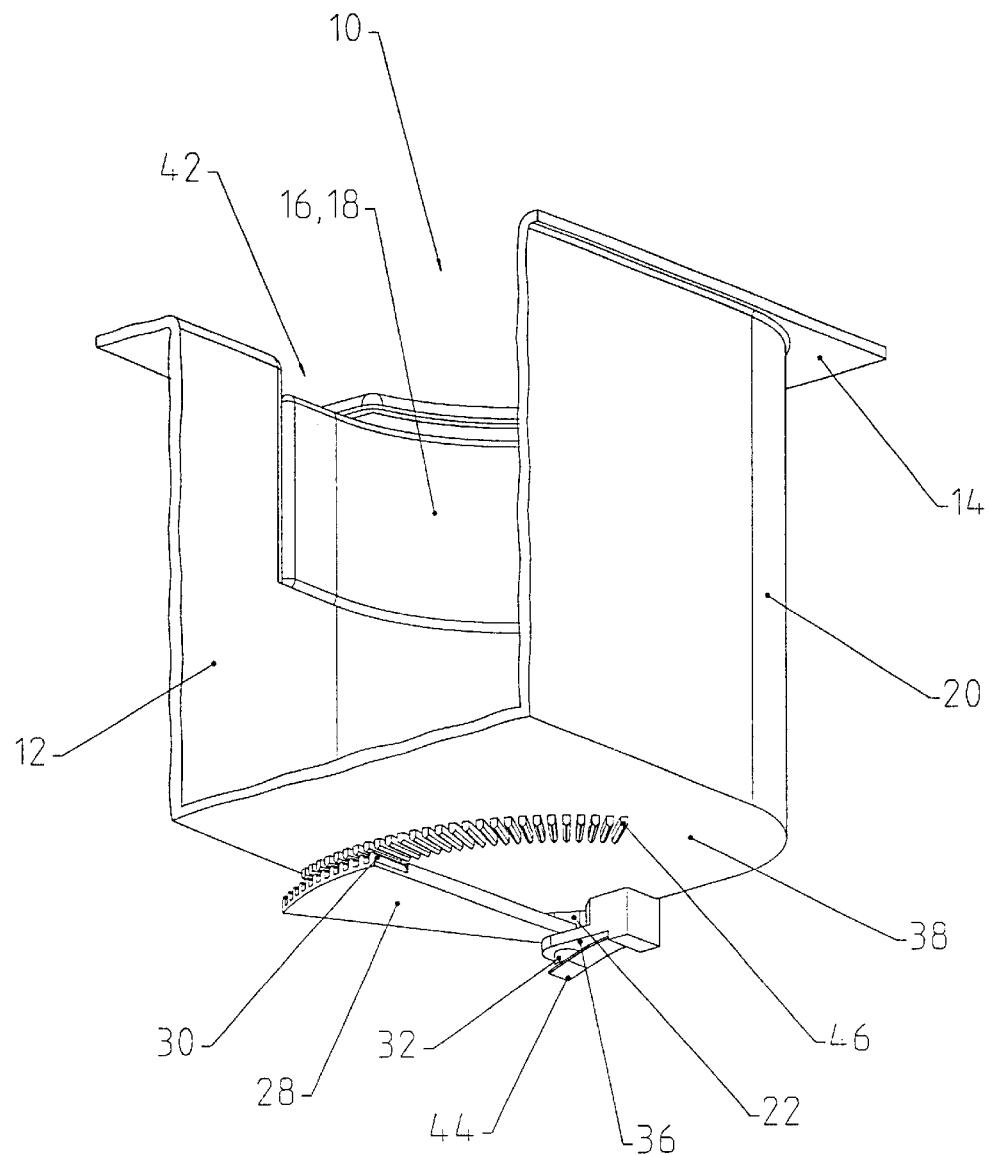
FIG. 2 shows the holder of FIG. 1 in an assembled state in a prospective representation, projecting from below, whereby the direction of view is oppositely directed to that of FIG. 1.
Figure 3:
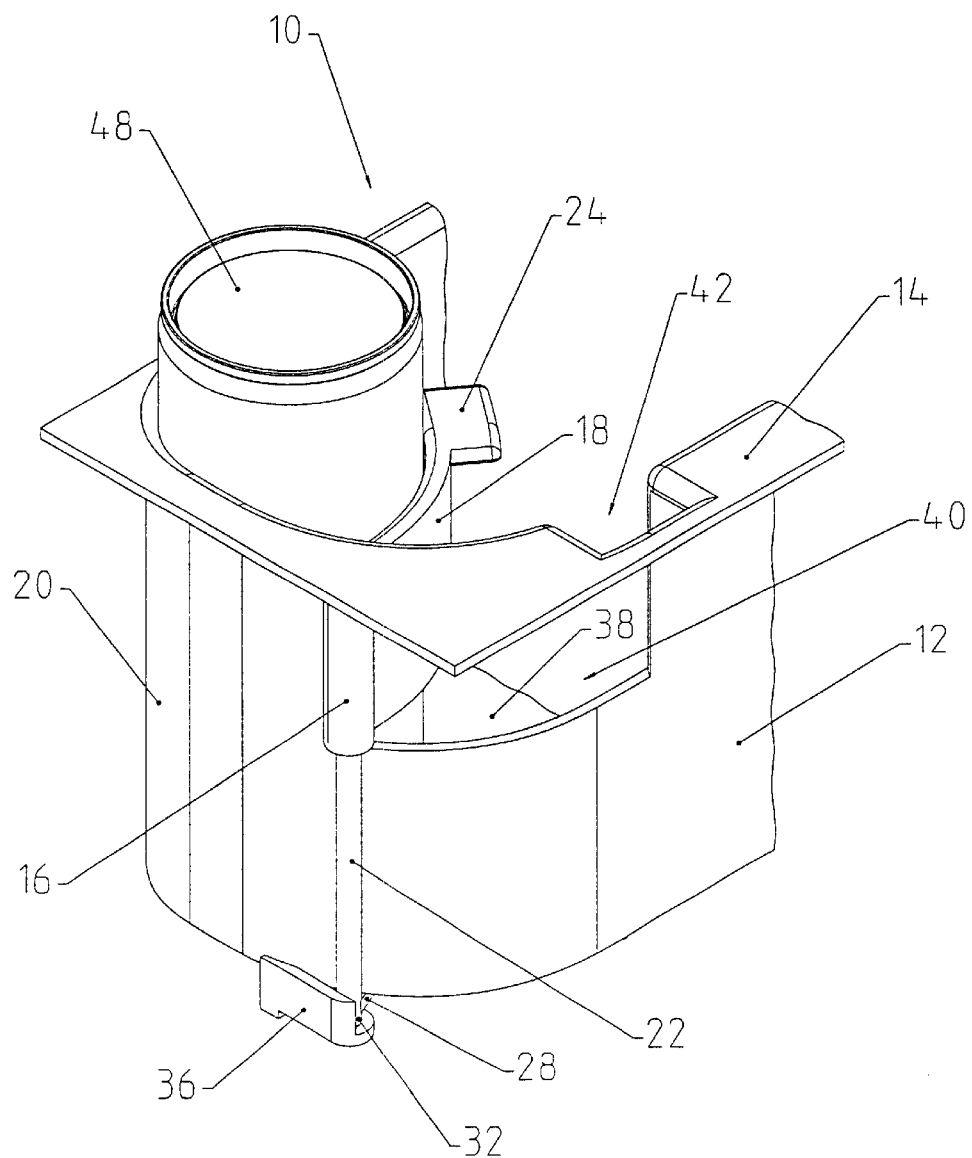
FIG. 3 shows the holder of FIG. 1 in an assembled state in use with the same view direction as in FIG. 1.

A flat spring 44 is mounted in assembly on an underside of the support cover plate 36 (FIG. 2). The flat spring 44 forms a spring element, which presses axially against the lower pivoting positional pin 32 of the swivel shaft 22 of the support 16. The flat spring 44 thereby presses the support upward. With the assembly holder 10, the arm 28 of the support 16 is found on an underside of the bottom or floor 38 of the pigeon hole 12.

As shown in FIG. 2, the floor 38 of the pigeon hole 12 has toothing 46, which is circular and disposed concentric to the swivel shaft 22. The toothing 46 of the floor 38 is complementary to the toothing 30 of the arm 28 of the support 16. The flat spring 44, which presses the support 16 upwardly, presses the two toothings 30, 46 into one another. In this manner, the support 16 is immovably held in its respective swiveling position. By means of downward pressure of the support 16 against the force of the flat spring 44, as shown in FIG. 2, the two toothings 30, 46 are brought out of engagement and the support can be swiveled. If the support 16 is subsequently released, the flat spring 44 again presses the support 16 upward and thereby brings the two toothings 30, 46 into engagement with one another. The support 16 is thereby securely held in its respective swiveling position. Pressing down and pivoting of the support 16 takes place on the bottom 24 on the upper side of the support 16. Both toothings 30, 46 form a locking device of the inventive holder, which holds the support 16 securely in its respective swiveling position and which is releasable by pressure on the support 16 from above against the force of the flat spring 44. Together, the arm 38 of the support 16 with its toothing 30, the toothing 46 on the floor 38 of the pigeon hole 12, and the flat spring 44 form a locking or securing device 28, 30, 44, 46 for the support 16 of the holder 10. The toothing 30 of the arm 28 forms a securing element for the securing device 28, 30, 44, 46, and the toothing 46 on the floor 38 of the pigeon hole 12 forms a fixed counter element for the securing element. The securing device 28, 30, 44, 46 is not visible by its arrangement on the underside of the floor 38 of the pigeon hole 12 with a built-in pigeon hole 12.

If the plate 18 of the support 16 is swiveled from the recess 40 into the side wall 20 of the pigeon hole 12 inwardly into the pigeon hole 12, the plate 18 separates an area of the pigeon hole 12 and defines a receiving area for placement of a drink container (such as the drink bottle shown in FIG. 3) between the plate and the side wall 20 of the pigeon hole 12. Since the support 16 is securable in various swiveling positions, its distance from the side wall 20 is adjustable and, in this manner, the holder 10 is adaptable to the diameter of a drink container 48 to be inserted therein. When not in use, the support 16 is swiveled, such that its plate 18 is located in the recess 40 of the side wall of the pigeon hole 12. Then, the entirety of the pigeon hole 12 is useable.

The inventive holder 10 comprises in the illustrated and described embodiments only three parts, namely, the pigeon hole 12, witch which the support cover plate 36 is one-piece, the support 16, which includes the swiveling shaft 22, the plate 18, and the arm 28, and the flat spring 44. In principle, it is contemplated that the flat spring 44 or another spring element can be formed as one-piece from plastic with the pigeon hole 12, whereby only two parts would be necessary for the holder 10.

It will be understood that each of the elements described above, or two or more together, may also find a useful application in other types of constructions differing from the types described above.

While the invention has been illustrated and described herein as a holder for beverage containers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Holder for a beverage container, comprising a receiving area with a side wall for placement of a beverage container and support, said support being pivotable about a swiveling axis, wherein a distance of the support from the sidewall is adjustable wherein said support is securable into a respective swiveling position by a securing device, wherein the securing device (28, 30, 44, 46) has a securing element (30), wherein said securing element (30) is arranged at a distance from the swiveling axis of the support (16) and is fixedly connected to the support (16), wherein said securing element (30) is pressed against a fixed counter element (46) on the holder (10) by a spring element (44) and wherein the securing element (30) and/or the counter element (46) is circularly and concentrically arranged relative to the swiveling axis of the support (16).

2. The holder as defined in claim 1, wherein the holder (10) has a pigeon hole (12) with a side wall (20), wherein the support (16) separates a part of the pigeon hole (12) from the remainder of the pigeon hole (12), wherein said part is between the support (16) and the side wall (20) of the pigeon hole (12) and forms the receiving area for placement of the drink container (48), and wherein the support is pivotably supported on the pigeon hole (12).

3. The holder as defined in claim 1, wherein the securing device (28, 30, 44, 46) has a locking device (30, 46).

4. The holder as defined in claim 3, wherein the securing element (30) and the counter element (46) each have a toothing (30, 46).

5. The holder as defined in claim 1, wherein the securing element (30) is releasable from the counter element (44) by pressure on the support (16) against a force of the spring element (44).

6. Holder for a beverage container, comprising a receiving area with a side wall for placement of a beverage container and support, said support being pivotable about a swiveling axis, wherein a distance of the support from the sidewall is adjustable, wherein said support is securable into a respective swiveling position by a securing device, wherein the securing device (28, 30, 44, 46) has a securing element (30), wherein said securing element (30) is arranged at a distance from the swiveling axis of the support (16) and is fixedly connected to the support (16), wherein said securing element (30) is pressed against a fixed counter element (46) on the holder (10) by a spring element (44), wherein the receiving area for placement of the drink container (48) has a floor (38), and wherein the spring element (44) and the counter element (46) are disposed on an underside of the floor (38).

\* \* \* \* \*